US011379242B2

(12) United States Patent
Hagiescu Miriste et al.

(10) Patent No.: US 11,379,242 B2
(45) Date of Patent: Jul. 5, 2022

(54) METHODS AND APPARATUS FOR USING LOAD AND STORE ADDRESSES TO RESOLVE MEMORY DEPENDENCIES (71) Applicant: Intel Corporation, Santa Clara, CA (US)

(72) Inventors: Andrei Mihai Hagiescu Miriste, Toronto (CA); Byron Sinclair, Santa Clara, CA (US); Joseph Garvey, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 917 days.

(21) Appl. No.: 15/637,637

(22) Filed: Jun. 29, 2017

(65) Prior Publication Data
US 2019/0004804 A1 Jan. 3, 2019

(51) Int. Cl.
*G06F 9/38* (2018.01)
*G06F 9/48* (2006.01)
*G06F 9/30* (2018.01)

(52) U.S. Cl.
CPC ......... *G06F 9/3838* (2013.01); *G06F 9/3004* (2013.01); *G06F 9/3834* (2013.01); *G06F 9/3842* (2013.01); *G06F 9/3851* (2013.01); *G06F 9/3861* (2013.01); *G06F 9/4806* (2013.01)

(58) Field of Classification Search
CPC .............................. G06F 9/3834; G06F 9/3838
See application file for complete search history.

(56) References Cited

U.S. PATENT DOCUMENTS

| 5,787,474 A | 7/1998 | Pflum |
| 5,999,727 A * | 12/1999 | Panwar ............... G06F 9/30043 712/218 |
| 6,154,815 A | 11/2000 | Hetherington et al. |
| 6,385,715 B1 * | 5/2002 | Merchant ............... G06F 9/383 712/218 |
| 6,684,299 B2 | 1/2004 | Hetherington et al. |
| 6,981,129 B1 * | 12/2005 | Boggs .................. G06F 9/3842 712/218 |
| 7,596,707 B1 | 9/2009 | Vemula |
| 9,075,724 B2 | 7/2015 | Isherwood et al. |
| 10,437,595 B1 * | 10/2019 | Kanapathipillai .. G06F 9/30021 |
| 2003/0033511 A1 * | 2/2003 | Akkary .................. G06F 9/384 712/235 |

(Continued)

Primary Examiner — Jacob Petranek (57) ABSTRACT

An integrated circuit may include elastic datapaths or pipelines, through which software threads or iterations of loops, may be executed. Throttling circuitry may be coupled along an elastic pipeline in the integrated circuit. The throttling circuitry may include dependency detection circuitry that dynamically detect memory dependency issues that may arise during runtime. To mitigate these dependency issues, the throttling circuitry may assert stall signals to upstream stages in the pipeline. Additionally, the throttling circuitry may control the pipeline to resolve a store operation prior to a corresponding load operation in order to avoid store/load conflicts. In an embodiment, the throttling circuitry may include a validator circuit, a rewind block, a revert block, and a flush block. The throttling circuitry may pass speculative iterations through the rewind block, and later validate the speculative iterations using the validator block.

20 Claims, 8 Drawing Sheets (56) References Cited

U.S. PATENT DOCUMENTS

| | | | |
|---|---|---|---|
| 2004/0268334 A1* | 12/2004 | Muthukumar | G06F 8/4452 717/160 |
| 2007/0136523 A1 | 6/2007 | Bonella et al. | |
| 2009/0210587 A1* | 8/2009 | Barrick | G06F 9/30043 710/56 |
| 2010/0262967 A1* | 10/2010 | Eisen | G06F 9/485 718/102 |
| 2014/0108862 A1* | 4/2014 | Rafacz | G06F 9/3834 714/15 |
| 2017/0192751 A1* | 7/2017 | Lingam | G06F 7/523 |
| 2017/0351522 A1* | 12/2017 | Ayub | G06F 9/30043 |

\* cited by examiner

METHODS AND APPARATUS FOR USING LOAD AND STORE ADDRESSES TO RESOLVE MEMORY DEPENDENCIES

BACKGROUND

This relates to integrated circuits and, more particularly, to handling runtime memory dependencies in integrated circuits.

Programmable integrated circuits are a type of integrated circuit that can be programmed by a user to implement a custom logic function. In a typical scenario, a logic designer uses computer-aided design tools to design a custom logic circuit. When the design process is complete, the computer-aided design tools generate configuration data. The configuration data is used to configure the devices to perform the functions of the custom logic circuit.

During runtime, a configured device executes memory transactions that require the device to read data stored in memory at various memory addresses and to write corresponding computed data into memory at various memory addresses. In some cases, the device can subsequently access the computed data while executing a subsequent memory transaction.

However, a device executing two related memory transactions independently can mistakenly read, from a memory address, data that is not ready to be accessed. It is within this context that the embodiments herein arise.

DETAILED DESCRIPTION

The present embodiments relate to throttling circuitry coupled along a pipelined datapath in an integrated circuit. The throttling circuitry may include dependency detection circuitry that dynamically detects memory dependency issues that may arise during runtime. To mitigate these dependency issues, the throttling circuitry may assert stall signals to upstream stages in the pipelined datapath. Additionally, the throttling circuitry may control the pipelined datapath to resolve a store operation prior to a corresponding load operation in order to avoid store-load memory access collisions.

It will be recognized by one skilled in the art, that the present exemplary embodiments may be practiced without some or all of these specific details. In other instances, well-known operations have not been described in detail in order not to unnecessarily obscure the present embodiments. Although the embodiments herein may describe features related to integrated circuits, and more specifically programmable integrated circuits, it will be recognized by one skilled in the art that the embodiments herein may be practiced using different types of integrated circuits, other types of processing circuitry, or any other type of suitable circuitry.

Figure 1:
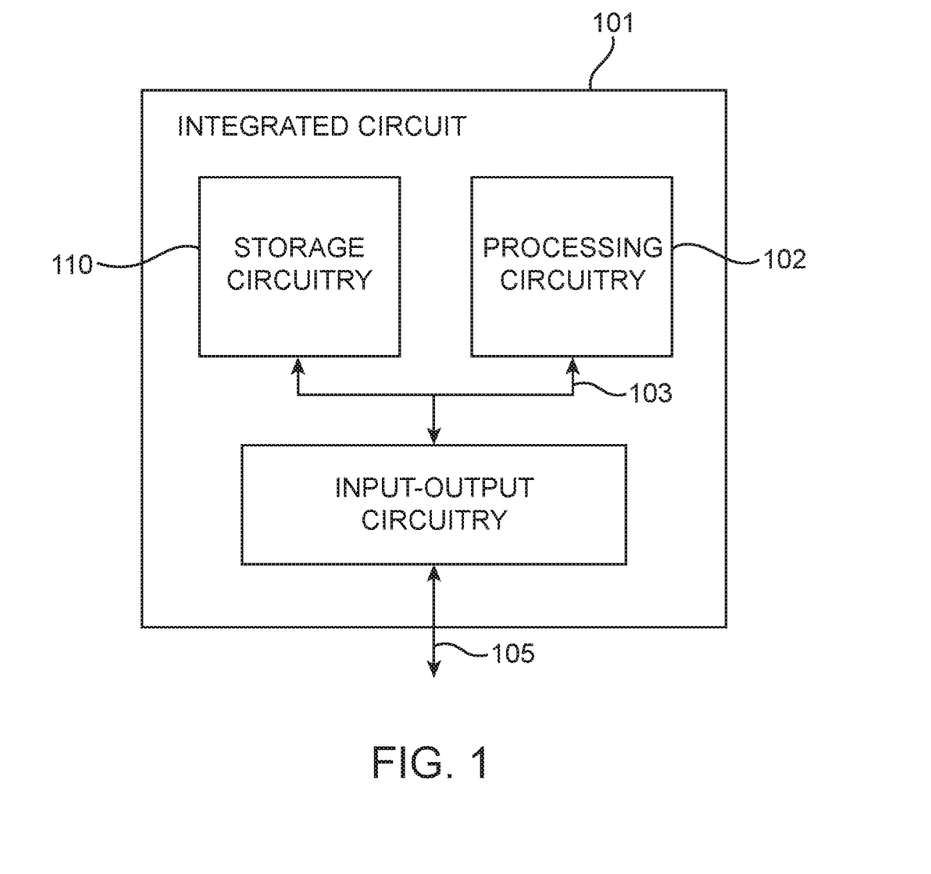
FIG. 1 is a diagram of an illustrative integrated circuit in accordance with an embodiment.

An illustrative embodiment of an integrated circuit 101 is shown in FIG. 1. Integrated circuit 101 may have multiple components. These components may include processing circuitry 102, storage circuitry 110, and input-output circuitry 104. Processing circuitry 102 may include embedded microprocessors, digital signal processors (DSP), microcontrollers, or other processing circuitry.

Storage circuitry 110 may have random-access memory (RAM), read-only memory (ROM), or other addressable memory elements. Storage circuitry 110 may be a single-port memory, a dual-port memory, a quad-port memory, or have any other arbitrary number of ports. If desired, storage circuitry 110 may be implemented as a single-port memory (or a dual-port memory, a quad-port memory, etc.) with control circuitry that emulates dual-port, quad-port, or other multi-port behavior.

Internal interconnection resources 103 such as conductive lines and busses may be used to send data from one component to another component or to broadcast data from one component to one or more other components. Processing circuitry 102 may access storage circuitry 110 by sending read and/or write requests over interconnection resources 103 to storage circuitry 110. In some embodiments, external components may access storage circuitry 110 via external interconnection resources 105, input-output circuitry 104, and interconnection resources 103. In response to receiving a read request, storage circuitry 110 may retrieve the requested data and send the retrieved data over interconnection resources 103 to the requestor. In case of a write request, storage circuitry 110 may store the received data.

External interconnection resources 105 such as conductive lines and busses, optical interconnect infrastructure, or wired and wireless networks with optional intermediate switches may be used to communicate with other devices. Input-output circuitry 104 may include parallel input-output circuitry, differential input-output circuitry, serial data transceiver circuitry, or other input-output circuitry suitable to transmit and receive data.

During runtime, an integrated circuit, such as integrated circuit 101 may use processing circuitry 102 and other support circuitry (e.g., storage circuitry 110) to execute threads (e.g., software iterations, software code) and perform corresponding computation tasks (e.g., arithmetic tasks, arithmetic computations, store, load, etc.). To perform computation task, integrated circuit 101 may access storage circuitry 110 (e.g., read from and write into storage circuitry 110).

Integrated circuit 101 may include datapaths (e.g., pipelined data paths which are sometimes referred to herein as pipelines) through which these threads are executed (e.g., through which iterations of loops or repetitive threads are completed). If desired, the datapaths may include registers (e.g., pipeline registers, resettable registers, etc.), multiplexers, logic gates, interconnection circuits, processing circuits, or any other suitable components. In particular, the datapaths may include load blocks (sometimes referred to as loading blocks, memory loading circuits, memory read circuitry, etc.), compute blocks (sometimes referred to as compute logic, computational circuits, arithmetic circuits, etc.), and store blocks (sometimes referred to as memory storing circuits, memory write circuitry, etc.).

As an example, when a load block in a given datapath receives a read address signal, the load block may perform read operations based on the received read address signal to retrieve stored data (e.g., to load/read data from storage circuitry 110 at a corresponding memory read address). When a compute block in the given datapath subsequently receives the retrieved data, the compute block may perform computations (e.g., arithmetic operations) based on the retrieved data to generate newly computed data. When a store block coupled along the given datapath subsequently receives the newly computed data, the store block may perform write operations based on the newly computed data and a corresponding write address signal (e.g., to store the computed data at a corresponding memory write address in storage circuitry 110).

In general, a load operation, a compute operation, or a store operation may be referred to herein as a stage (e.g., a load stage, a compute stage, or a store stage). As an example, a load block may include one or more serial/parallel loading stages, a compute block may include one or more serial/parallel computing stages, and a store block may include one or more serial/parallel storing stages. A pipeline (e.g., pipelined datapath) may include load stages, compute stages, and store stages in that order. This is merely illustrative. If desired, an integrated circuit may include pipelines with any number of load, compute, store, or other functional blocks in any suitable configuration to execute corresponding software instructions. In an embodiment, the pipeline in this particular configuration may complete a thread or iteration once the iteration passes through all three types of stages.

Figure 2A:
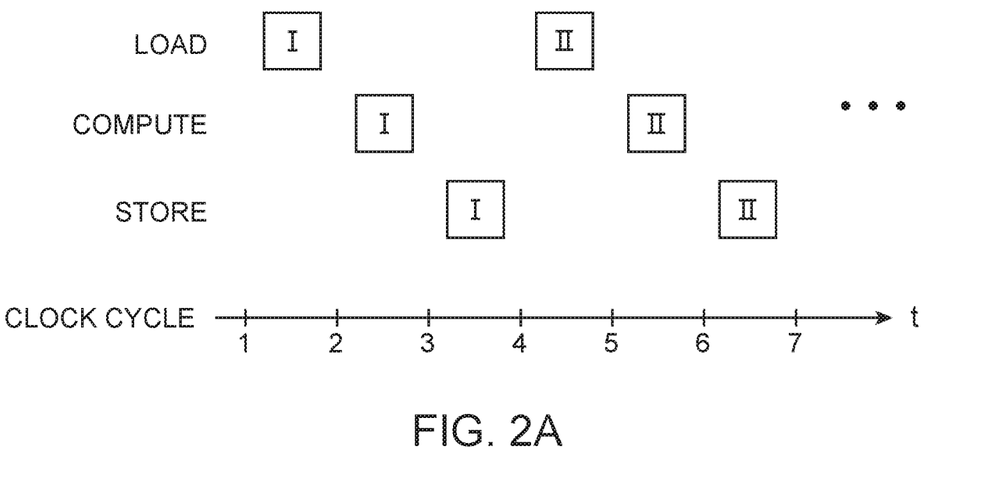
FIGS. 2A and 2B are timing diagrams illustrating the operations of two different types of datapaths in accordance with an embodiment.

If desired, a datapath may process threads in parallel or serially. The timing diagram of FIG. 2A illustrates the operation of a sequential (non-pipelined) datapath that executes thread I, thread II, etc. (e.g., iteration I, iteration II, etc.), serially. As an example, during a first clock cycle (e.g., form time 1 to time 2), the datapath may perform a load operation (e.g., using a load block) for thread I. During a second clock cycle (e.g., from time 2 to time 3), the datapath may perform a compute operation (using a compute block) for thread I. During a third clock cycle (e.g., from time 3 to time 4), the datapath perform a store operation (using a store block) thereby finishing the execution of thread I. The timing for executing thread I or any thread in three clock cycles is merely illustrative. As an example, integrated circuits may execute a thread in one clock cycle, more than one clock cycle, less than one clock cycle.

When using a sequential datapath, only after completely executing thread I, can the execution of thread II begin. In particular, during the fourth, fifth, sixth clock cycles (e.g., from time 4 to time 7), the sequential datapath may perform load, compute, and store operations respectively. All subsequent threads may be completed similarly (in a serial scheme). In other words, a sequential datapath is a datapath with which execution of each thread occurs in a dependent manner (e.g., the load operation of a particular thread depends on the finished execution of the preceding thread, more specifically, a finished store operation of the preceding thread).

Figure 2B:
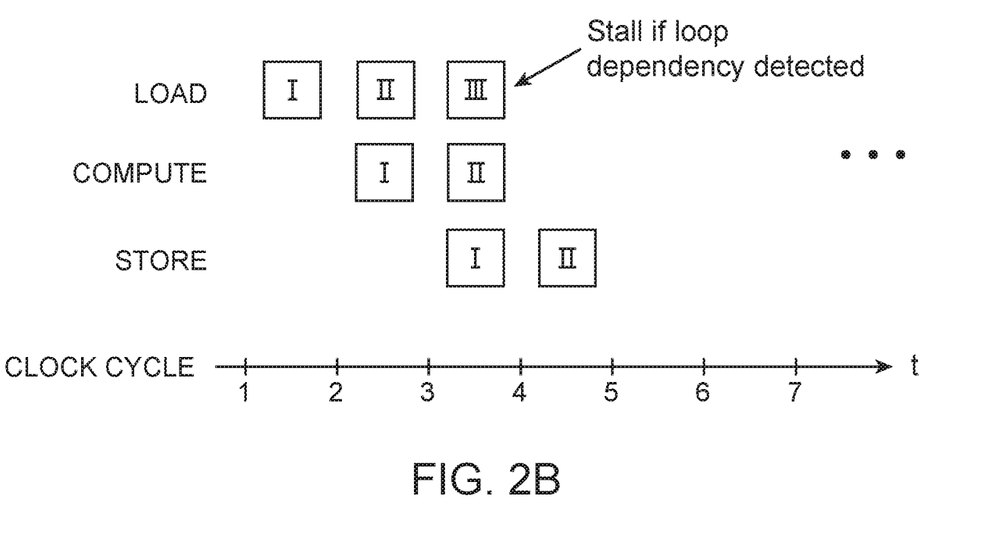

In accordance with an embodiment, the timing diagram of FIG. 2B illustrates the operation of a pipelined datapath that executes thread I, thread II, etc., in parallel. As an example, during a first clock cycle (e.g., from time 1 to time 2), the pipeline may perform a load operation for thread I, similar to the operation of the datapath in FIG. 2A. During a second clock cycle (e.g., from time 2 to time 3), the pipeline may perform a compute operation for thread I, while simultaneously performing a load operation for thread II. During a third clock cycle (e.g., from time 3 to time 4), the pipeline may perform a store operation for thread I, while simultaneously performing a compute operation for thread II, while also simultaneously performing a load operation for thread III. During each clock cycle, a pipeline may perform an operation in each block (e.g., in the load, compute, store blocks) in parallel. In other words, a pipelined datapath is defined as a datapath with which execution of each thread occurs in an independent manner (e.g., the load operation of a particular thread is independent of the finished execution of the preceding thread, more specifically, a finished store operation of the preceding thread).

Additionally, a pipelined datapath may be an elastic datapath (i.e., an elastic pipelined datapath). An elastic pipelined datapath may have multiple pipelined stages coupled together, where each stage can execute computations independently and each stage can stall a predecessor stage, if needed. As an example, because stages can execute computations independently in an elastic pipelined datapath, an integrated circuit may use elastic pipelined datapaths to improve data flow and data throughput. If desired, the integrated circuit may implement handshake protocols between the pipelined stages (e.g., control circuitry in the integrated circuit may selectively validate and stall different pipelined stages to achieve suitable operations).

In practice, problems may arise when loading stored data from an address that is empty or contains the wrong stored data because of memory dependencies. For example, still referring to FIG. 2B, a compute operation of thread III may require the output of the compute operation for thread II. In order to obtain the output of the compute operation for thread II, the load operation of thread III may load from an address (i.e., address A) that supposedly stores the computed value corresponding to thread II. In such a way, thread III may have a runtime or dynamic memory dependency on thread II.

Dynamic memory dependencies such as the example described above may cause computational problems. In particular, the store operation of thread II may occur only after the load operation of thread III. For example, the store operation of thread II may occur from time 4 to time 5, whereas the load operation of thread III occurs form time 3 to time 4. As such, if the load operation of thread III were fully executed, a wrong value will be loaded and a wrong computed value will be generated for thread III. Therefore, the load operation of thread III will have to be stalled (i.e., paused) in the pipeline until after the store operation for thread II is completed in the fourth clock cycle to prevent loading a wrong value.

For example, memory dependencies may occur when executing instructions relating to iterations of a loop. In particular, thread I may be a first iteration of the loop, thread II may be a second iteration of the loop, thread III may be a third iteration of the loop, etc. Additionally, a given iteration of the loop may depend on the result of a previous iteration of the loop. In other words, the load operation of a given iteration of the loop depends on the completion of the store operation of a previous iteration in the loop.

Figure 3:
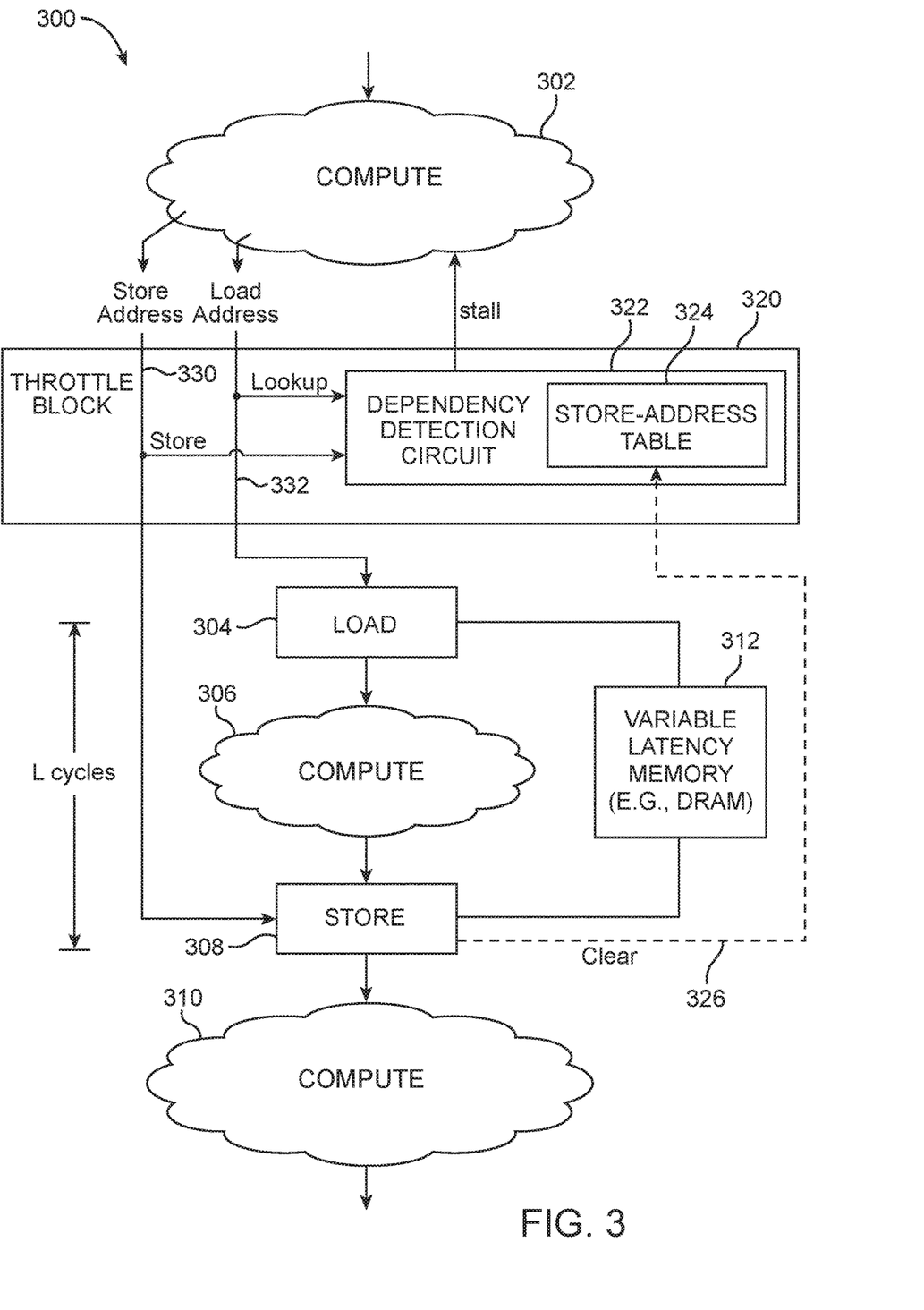
FIG. 3 is a diagram of an illustrative datapath that includes throttling circuitry in accordance with an embodiment.

Because the dynamic memory dependency problem relates to loading data from an address that has yet to have the proper data stored, a datapath (e.g., an elastic pipelined datapath) may include throttling circuitry that monitors all of the stored addresses that have recently been written into. FIG. 3 shows a datapath (e.g., datapath 300) that includes throttling circuitry such as throttle block 320.

As shown in FIG. 3, datapath 300 may include compute logic 302 (sometimes referred to herein as compute block 302) that receives an input into datapath 300 during runtime. If desired, compute block 302 may generate a load address and a store address for load block 304 (e.g., memory loading circuit 304) and store block 308 (e.g., memory storing circuit 308) based on the received input. As an example, compute logic 302 may include memory management circuitry, memory control circuitry, and other types of processing and/or control circuitry. Compute block 302 may form a portion of processing circuitry 102 in FIG. 1, if desired. As an example, compute block 302 may be an upstream compute block (e.g., a predecessor stage in datapath 300).

Datapath 300 may include a core portion that includes load block 304, compute block 306, and store block 308. The core portion of datapath 300 may relate to stages that execute the steps to be completed in order to finish executing the threads received by datapath 300. The example of the core portion in datapath 300 including only a load block, a compute block, and a store block is merely illustrative. If desired, any suitable block and corresponding operation may be formed as part of the core portion of a datapath.

Still referring to FIG. 3, load block 304, compute block 306, and store block 308 may be coupled in series. Load block 304 and store block 308 may be collectively referred to herein as memory access circuitry. As an example, the core portion of datapath 300 may be L cycles long. In particular, L may refer to a load-to-store latency in temporal space as the distance between blocks may be determined relative to clock cycles. L may similarly refer to a number of iterations or threads that may simultaneously be pending in datapath 300 (e.g., the capacity of datapath 300 to hold initialized but unfinished iterations). In the context of memory dependencies, L may refer to a number of store operations for corresponding threads that may simultaneously be pending in datapath 300. The core portion of datapath 300 may be downstream from compute block 302 and upstream from compute block 310 (e.g., compute logic 310). Compute block 310 may similarly form a portion of a downstream datapath or compute logic block. If desired, compute block 310 may receive an input from store block 308 that includes signals for executing subsequent threads. For example, compute block 310 may receive an address signal corresponding to the location of the most recently stored data.

If desired, load block 304 and store block 308 may be coupled to memory 312 (e.g., a variable latency memory, dynamic random-access memory, etc.). Memory 312 may form a portion of storage circuitry 110 in FIG. 1 (as an example). Alternatively, memory 312 may be separate from storage 110. Load block 304 may receive a load address via path 332 (e.g., from compute block 302) and use the load address to access memory 312 in a load/read operation. Store block may receive a store address via path 330 (e.g., from compute block 302) and use the store address to access memory 312 in a store/write operation.

In an embodiment, throttle block 320 may be interposed between compute block 302 and the core portion of datapath 300. If desired, throttling circuitry 320 may be an interfacial circuit that is upstream from the core portion of datapath 300 such that any input signal to datapath 300 must pass through (or may selectively pass through) throttling circuitry 320 before reaching the core portion of datapath 300.

Throttling circuitry 320 may include dependency detection circuitry 322. Dependency detection circuitry 322 may maintain a store address history table (e.g., store-address table 324). Store-address table 324 may include entries of in-flight store addresses. A store address may be considered "in-flight" after it has been received as an input via path 330 and before it is cleared or removed from table 324 via path 326. The store address is cleared (e.g., a clear control signal sent to dependency detection circuit to remove the corresponding entry in table 324) after store block 308 successfully stores the corresponding data to the store address. In other words, the list of in-flight store addresses stored in table 324 represent store addresses that are at risk of raising memory dependency issues.

The maximum size N of table 324 (e.g., the maximum number of entries N in table 324) may be determined by the L cycles of the core portion of datapath 300. In particular, N should be at least equal to if not greater than L in order to keep track of all in-flight store addresses. If desired, when the size capacity of table 324 is not large enough to support L cycles, the effective size of the core portion in datapath 300 should be "decreased" (e.g., not all L cycles need to be used) to achieve an effect size of L' that is at least equal to or less than N. In other words, when L is decreased, datapath 300 may reduce the number of simultaneously pending iterations or more specifically reduce the number of simultaneously pending store operations corresponding to the iterations, as an example.

As previously described, dependency detection circuit 322 may receive initialized store addresses via path 330 and use the received store addresses to update table 324 (e.g., to store the received store addresses in table 324). On the other hand, dependency detection circuit 322 may also receive load addresses. The load addresses may be used as look-up values to check against address entries in table 324 for memory dependency issues (e.g., to detect for load/store conflicts or read/write collisions). In particular, if a load address (i.e., a look-up address) collides with an in-flight store address entry in table 324, then dependency detection circuit 322 may trigger (e.g., enable or assert) a stall signal to any circuitry upstream from the core portion of datapath 300 (e.g., throttling circuitry 320 may stall compute block 302). As an example, if there is no match between a look-up load address and any in-flight store addresses in table 324, processing in datapath 300 may proceed as normal (e.g., the stall signal is not asserted).

In order to compare an incoming load address signal with a stored store address signal, dependency detection circuitry 322 may include comparison circuitry (e.g., comparison circuits formed from logic gates, combinational circuits, an any other suitable circuits). As an example, detection circuitry 322 may include multiple comparison circuits, each of which may compare a respective bit of the entire address signal. As an example, the number of comparison circuits may be equal to the maximum number of bits in the largest possible address. If desired, the number of comparison circuits may be less than the maximum number of bits in the largest possible address. For example, only a subset of the bits (e.g., only the less significant bits, only the more significant bits, only the middle bits, etc.) may be compared to conserve hardware resources. This is merely illustrative. If desired, any comparison scheme may be used to determine whether an incoming load address matches an in-flight store address stored in table 324.

Figure 4:
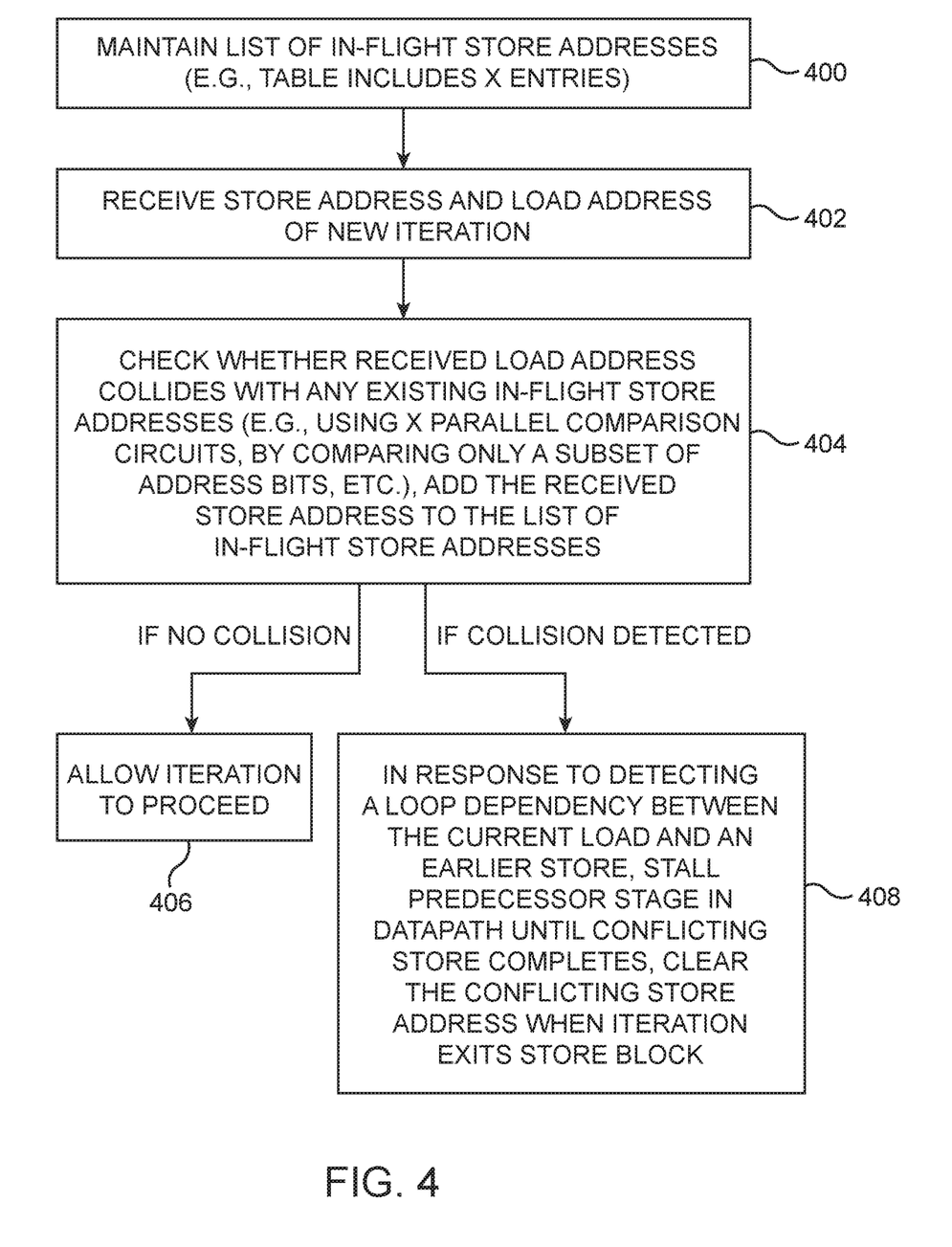
FIG. 4 is a flowchart of illustrative steps for operating throttling circuitry in a datapath by maintaining a store address table in accordance with an embodiment.

FIG. 4 is a flowchart of illustrative steps for operating throttling circuitry in a datapath during runtime, such as operating throttling circuitry 320 of datapath 300 in FIG. 3.

At step 400, a throttle block may maintain a list of in-flight store addresses. For example, throttle block 320 may include a table with X entries, each corresponding to an in-flight store address (e.g., store-address table 324 in FIG. 3).

At step 402, during runtime, the throttle block may receive store address and load address of a new iteration (e.g., generated by compute block 302).

At step 404, the throttle block may determine or check whether the load address received at step 402 collides (e.g., matches) with any existing in-flight store addresses (e.g., in table 324 in FIG. 3). A collision between the received load address and any one of the existing in-flight store addresses may indicate a memory dependency problem. As an example, comparison circuitry in throttle block 320 may perform the check operation by comparing all X bits of the corresponding addresses (e.g., the received load address and a given in-flight store address) or only a subset of the X bits in the corresponding addresses. As previously described, only a subset of the bits may be compared to conserve hardware resources because a smaller number of comparison circuits may be required to perform the address comparison operation. As an example, if a store address and a load address both include eight bits, eight separate comparison circuits may be required to compare all eight bits. However, if only the less significant six bits of the store and load addresses are compared, only six separate comparison circuits may be required, thereby conserving hardware resources that would have otherwise been used to implement the two extra comparison circuits. Additionally, at step 404, the store address received at step 402 may also be stored as an in-flight store address in the table (e.g., the table may be updated to include the received store address).

If the comparison circuitry in the throttle block detects no match or collision between a received load address and any in-flight store addresses, throttle block may process step 406 and allow the incoming iteration using the received store and load addresses to proceed through the datapath. After allowing the iteration to pass in step 406, the throttle block may wait for the next iteration. As such, the throttle block may loop back to step 402 once the next iteration arrives at the throttle block, as an example.

Alternatively, if the comparison circuitry in the throttle block detects a match or collision between a received load address and an in-flight store address, the throttle block may proceed to process step 408. At step 408, in response to detecting a memory dependency collision (e.g., a loop memory dependency) between, the load address received at step 402 and an in-flight address, the throttle block may stall the predecessor stage in the datapath until the conflicting store operation completes (e.g., the throttle block may pause or stop accepting inputs from the predecessor stage in the datapath until the store operation associated with the in-flight address that matched the current load address completes).

Also at step 408, the throttle block may clear store addresses in the table when an iteration (e.g., an iteration of a loop or a particular thread) is completed and exits a store block, (e.g., store block 308). As shown in in FIG. 3, clear path 326 may enable store block 308 to transmit a signal (with the corresponding store address) to throttle block to remove the respective entry corresponding to the store address.

Using the throttle block to check for dependencies before any load addresses reach any load blocks or load stages in the core portion of the datapath eliminates or at least minimizes the likelihood that memory load-store collisions from incorrect ordering of load and store operations may occur. However, in some scenarios, a store address may not be readily available as an input to a datapath from an upstream stage. As an example, a store address may only be computed after the compute stage. Therefore, it may be difficult to maintain a table of in-flight addresses at the top of a datapath. In this scenario, a datapath may include a validator circuit, a revert circuit, and a rewind circuit to perform memory dependency checks as shown in FIG. 5.

Figure 5:
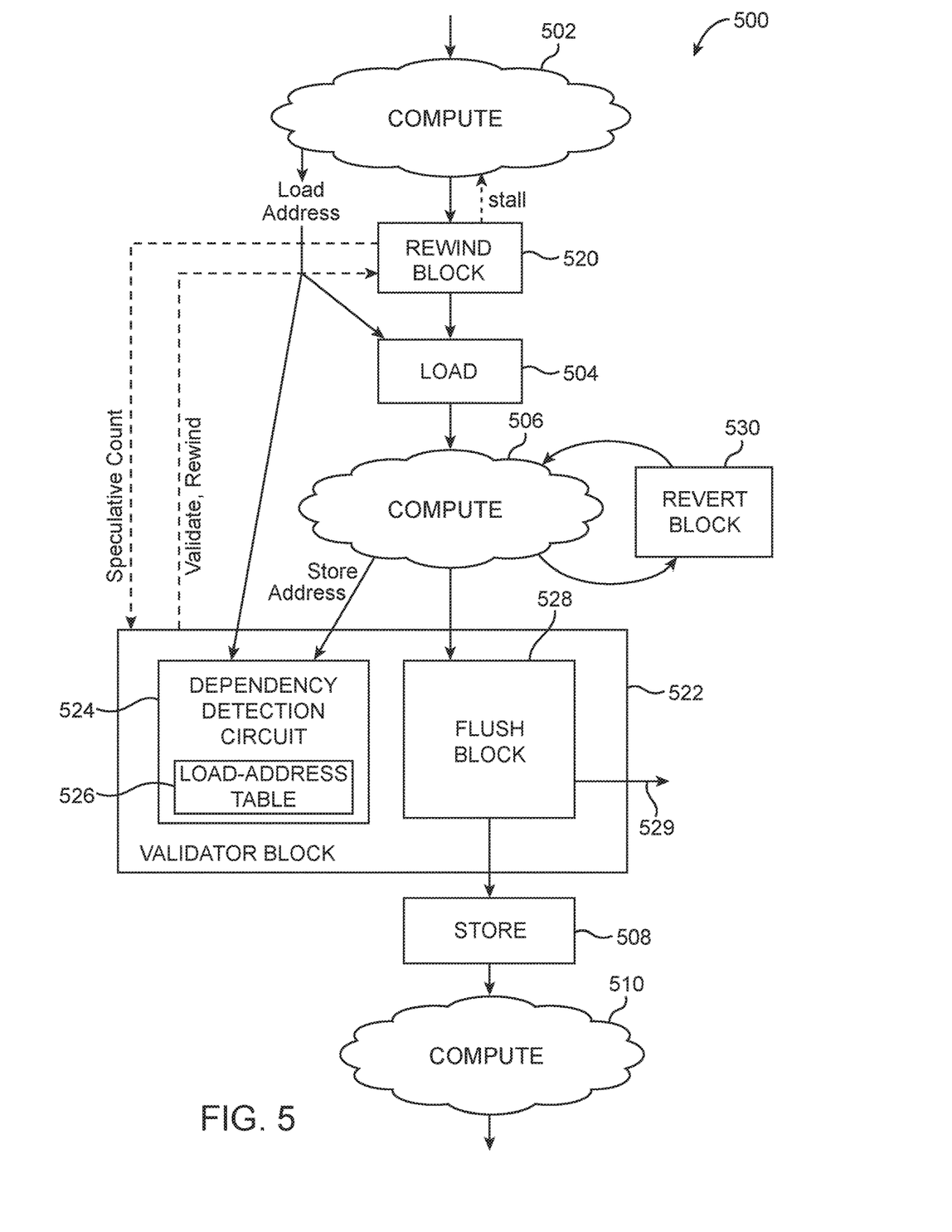
FIG. 5 is a diagram of an illustrative datapath having throttling circuitry which includes a validator circuit, a rewind circuit, and a revert circuit in accordance with an embodiment.

Some of the features shown in FIG. 5 (e.g., upstream compute logic 502, load circuit 504, core compute logic 506, store circuit 508, downstream compute logic 510, etc.) were previously described in connections with FIG. 3. As such, detailed descriptions of these features are omitted for the sake of brevity. Unless otherwise described, these features may be assumed to have similar functions as previously described.

FIG. 5 shows datapath 500, which includes upstream compute block 502 (e.g., upstream compute logic 502). Different from upstream compute block 302, compute block 502 may provide a load address, but not a store address, to the core portion of datapath 500 (i.e., load block 504, compute block 506, and store block 508). In particular, load block 504 may receive the load address generated by upstream compute block 502. If desired, upstream compute block 502 may provide additional signals to block 504 via rewind block 520 (e.g., to later generate a store address). Load circuit 504 and store circuit 508 may similarly be coupled to memory (similar to memory 312 in FIG. 3) to load from and store to the memory.

In an embodiment, compute block 506 (sometimes referred to as compute logic or computation circuitry) may generate a store address that is used to perform store operations at store block 508. Because the store address for the current iteration is generated later in datapath 500 (as compared to earlier in datapath 300 in FIG. 3), datapath 500 may include validator circuit 522 downstream from compute block 508 to receive the store address. Validator circuit 522, rewind circuit 520, and revert circuit 530 may be sometimes referred to in combination herein as throttling circuitry. Validator circuit 522 may be referred to herein as validator block. Similarly, rewind circuit 520 may be referred to herein as rewind block 520, and revert circuit 530 may be referred to herein as revert block 520.

Validator block 522 may also receive the load address for the current iteration. Similar to throttle block 322 in FIG. 3, validator block 522 may include a dependency detection circuit (e.g., dependency detection circuit 524) that maintains an address table (e.g., load-address table 526). Dependency detection circuit 524 may also include comparison circuitry. The comparison circuitry in circuit 524 may be similar to that of circuit 322 in FIG. 3.

Load-address table 526 may store load addresses (e.g., un-validated load addresses) instead of in-flight store addresses as described in connection with store-address table 324 in FIG. 3. If desired, table 526 may store entries of addresses as similarly described in connection with table 324 in FIG. 3. Validator block 522 and consequently dependency detection circuit 524 may receive speculative load addresses (e.g., in-flight load addresses) to be stored in table 526. Validator block 522 and consequently dependency detection circuit 524 may also receive computed store address generated from compute block 506. After receiving a computed store address generated from compute block 506, dependency detection circuit 524 may check the computed store address against entries in address table 526 to identify a possible match (e.g., to detect an address collision) between the stored speculative load address and the computed store address or a validation of the speculative load address associated with the iteration of the computed store address.

Because the collision check mechanism (e.g., dependency detection circuit 524) is downstream from load block 504 and compute block 506. Un-validated iterations may pass through at least part of the core portion in datapath 500 before any potential errors are caught. Un-validated iterations are iterations with load address that have not been matched with a downstream store address and iterations with store address that have not yet been computed.

As such, rewind block 520 may be interposed between upstream compute block 502 and load block 504, to pass un-validated or speculative iterations into the core portion of datapath 500 to compute a store address. Additionally, rewind block 520 may include storage structures that keep track of the un-validated iterations that have been speculatively passed through to load block 504. The storage structures may keep track of the un-validated load addresses as well as the number of un-validated load addresses. Rewind block 520 may provide a speculative count value (e.g., the number of un-validated load addresses) to validator block 522 to allow validator block 522 to keep track of the number of un-validated iterations.

To update the storage structures of rewind block 520, validator block 522 may communicate with rewind block 520 when any speculatively passed iterations or corresponding load/store pairs have been checked (regardless of the result of the check). As an example, if validator block 522 determines that, for a computed store address in a given iteration, there are no matches of the computed store address with any of the in-flight load addresses, the given iteration is validated. The validation signal may be generated by validator block 522 and received by rewind block 520. The number of speculative iterations at rewind block 520 may therefore decrease by one.

As an example, if validator block 522 determines that there is a match between the computed store address and at least one of the in-flight load addresses, validator block 522 may transmit a rewind signal to rewind block 520. Rewind block 520 may then remove all of the un-validated iterations by passing the iterations to flush block 528. Flush block 528 may pass the un-validated iteration to an unused output (e.g., output 529), as an example. After removing all of the un-validated iterations, thereby removing any effects of collisions, the un-validated iterations may be reissued in the rewind block. To reissue the un-validated iterations, rewind block 520 may cycle the un-validated iterations back into rewind block 520 via a loop path, thereby refilling the rewind block with the same flushed iterations in the same order. When validator block 522 detects a match or collision, rewind block 520 may stop new inputs from entering into rewind block 520 by asserting a stall signal. If at any time, the storage structures within rewind block 520 is full, rewind block 520 may also stop new inputs from entering into rewind block 520 by asserting a stall signal.

Outside of rewind operations, flush block 528 may act as a pass circuit that simply passes outputs of compute block 506 to store block 508. As an example, compute block 506 may pass computed store addresses as well as corresponding computed data values to storage block 508 via flush block 528. If desired flush block 528 may form a portion of validator block 522.

Additionally, validator block 522 may also control revert block 530 to revert setting in compute block in the event of a rewind operation. In particular, revert block 530 may keep track of values of loop-carried variables used by compute block 506 that are changed from iteration to iteration. After a rewind operation, revert block 530 changes the value setting back to the loop-carried variables stored corresponding to the earliest un-validated iteration that was flushed out.

Figure 6:
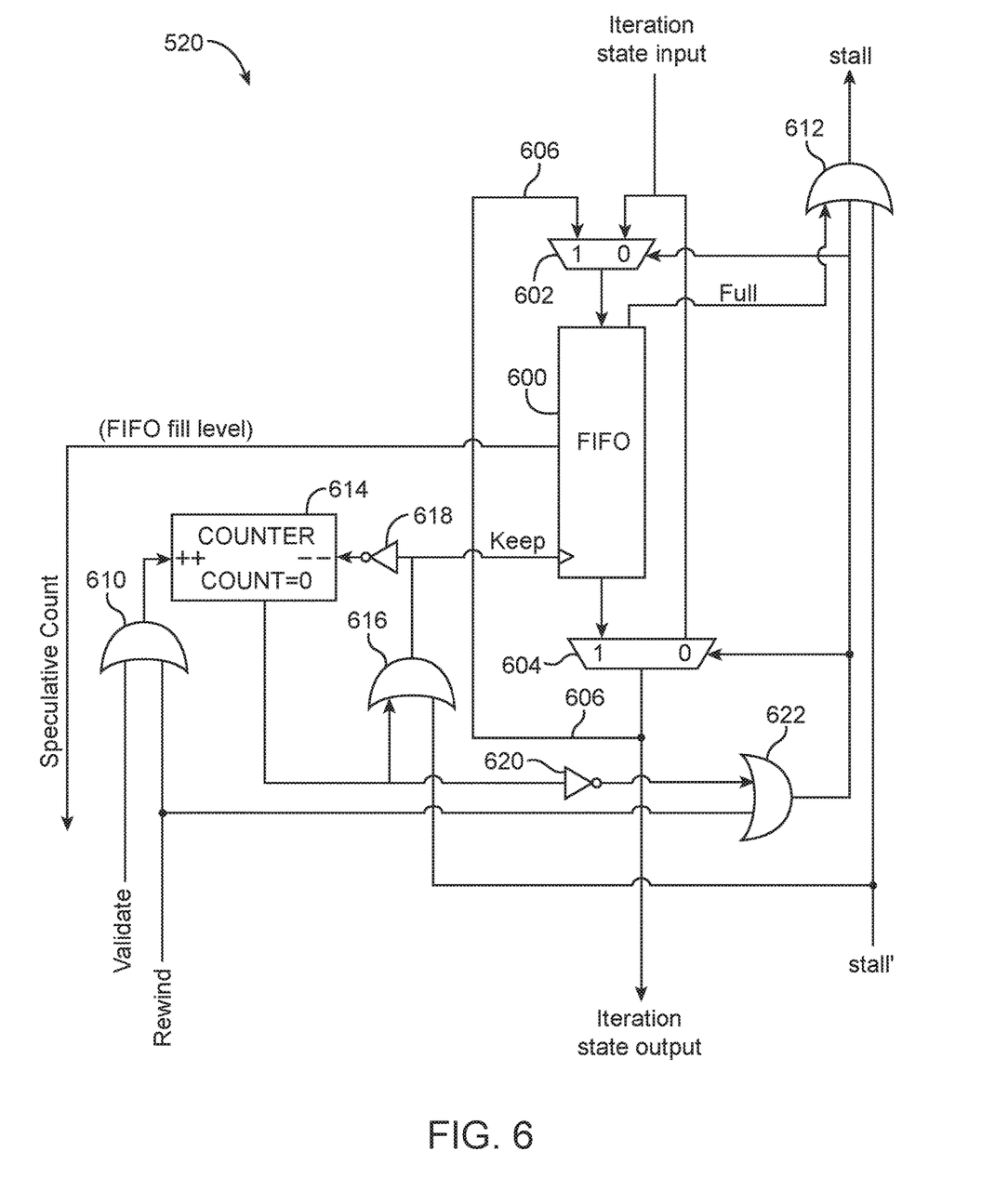
FIG. 6 is a diagram of an illustrative rewind circuit in accordance with an embodiment.

FIG. 6 is an illustrative rewind circuit of the type as shown in FIG. 5. In particular, rewind block 520 or rewind circuit 520 may include a first-in first-out circuit (e.g., FIFO 600), a counter block (e.g., counter 614), multiple logic gate circuits, and multiple selection circuits. As an example, an iteration state input identifying different iteration inputs may be received at a "0" terminal of selection circuit 602 (e.g., multiplexer 602) and at a "0" terminal of selection circuit 604 (e.g., multiplexer 604). Selection circuit 602 may be coupled to a data input of FIFO circuit 600 (e.g., storage structure 600) and may be used to fill FIFO circuit 600 with iteration data as specified by the iteration state input. Selection circuit 604 may be coupled to a data output of FIFO circuit 600 and may be used to remove iteration data from FIFO circuit 600 (e.g., remove validated iteration data, flush out conflicted iteration data, etc.). The output of selection circuit 604 (e.g., iteration state output) may be received by load block 504 in FIG. 5. The output of selection circuit 604 may also loop back to feed a "1" input of selection circuit 602 via path 606. In other words, path 606 may be used to reissue iteration state data as previously described.

FIFO circuit 600 may additionally generate FIFO status signals. In particular, FIFO circuit 600 may generate a FIFO fill level signal (e.g., a speculative count signal) that indicates the number of elements (or entries) within FIFO circuit 600. As previously described in connection with FIG. 5, validator block 522 may receive the speculative count signal, which determines the number of times the corresponding rewind signal should be asserted, as an example. Rewind block 520 may also receive validate and rewind signals from validator 522. The validate and rewind signals may be received at first and second input terminals of logic OR gate 610. The output of logic OR gate 610 is coupled to a first input of counter block 614. Counter block 614 may be a counter (e.g., an up-down counter), which maintains a counter value COUNT. Value COUNT may be initialized to a value of zero (e.g., value COUNT may be set to zero during the initialization of rewind circuit 520). The output of logic OR gate 610 may be provided to an increment input (e.g., a +1 input) of counter block 614 to increase value COUNT by one when an asserted signal is received at the increment input.

Counter block 614 may have an output that indicates when the maintained value COUNT is equal to zero. In other words, counter block 614 may provide an asserted output (e.g., a logic high output) when COUNT is equal to zero. The output of counter block 614 may be provided to inverter 620, and the corresponding negated output of counter block 614 may be provided to a first input of logic OR gate 622. The rewind signal may be provided to a second logic input of logic OR gate 622. The output of logic OR gate 622 may be provided to an input of logic OR gate 612. Additionally, selection circuits 602 and 603 may receive the output of logic OR gate 622 as control signals at respective control signal terminals. The output of logic OR gate 612 (e.g., a stall signal) may be a logic "1", which stalls an upstream stage from rewind block 520 or a logic "0", which indicates that no stall is required. Logic gate 612 may also receive a stall' signal as an additional input. FIFO circuit 600 may additionally provide a "full" indication signal (e.g., indicating that the fill level of FIFO 600 is full) to an input of logic OR gate 612.

When any of the full indication signal, output signal of logic OR gate 622, stall' signal is asserted, the output of logic OR gate 612 may be a logic "1". The stall' signal may be implemented as an additional condition under which an upstream stage should be stalled. As an example, if a related downstream stage from datapath 500 in FIG. 5 is stalled (e.g., an asserted stall' signal is received from a downstream stage), datapath 500 should also assert a stall signal. The downstream stall' signal may also be provided to a first input of logic OR gate 616. Logic OR gate 616 may receive a second input from the output of counter block 614. Inverter 618 may invert the output of logic OR gate and provide the inverted output to a decrement input (e.g., a −1 input) of counter block 614. Analogous to the increment input, an asserted decrement signal received at counter block 614 may decrease value COUNT by one.

The output of logic OR gate 616 may be provided to FIFO 600 as a keep signal. As an example, the output of logic OR gate 616 may be a logic "1", which keeps the earliest entry in FIFO circuit 600 (i.e., the earliest entry currently stored FIFO circuit 600), or a logic "0", which removes the earliest entry in FIFO circuit 600. The counter block keeps track of validate and rewind requests that cannot be release from the FIFO because a downstream stall signal stall' is asserted. Therefore, when the validate and rewind requests are released, the keep signal may be generated based on validate and rewind signals. As an example, because the validate and rewind signals are fed into logic OR gate 610, when one or both of the validate and rewinds signals are at a logic high (e.g., at a logic "1"), the output of logic OR gate 610 will also be at a logic high (e.g., a logic "1") and the earliest entry in FIFO circuit 600 may be removed.

Figure 7:
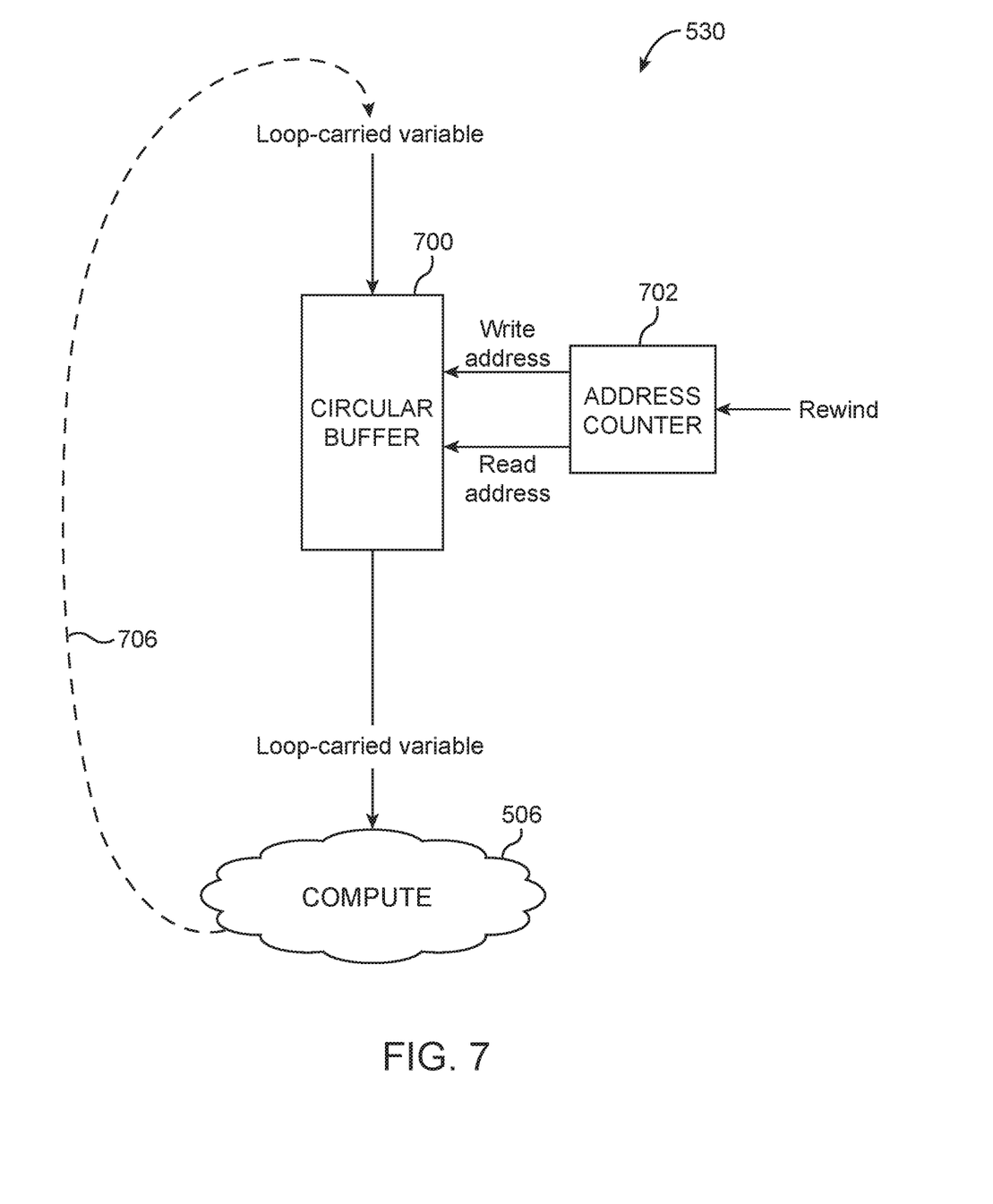
FIG. 7 is a diagram of an illustrative revert circuit in accordance with an embodiment.

FIG. 7 is an illustrative revert circuit 530 of the type as shown in FIG. 5. In particular, revert circuit 530 may include circular buffer 700 coupled to address counter 702. Address counter 702 may receive the rewind signal generated from validator block 522 in FIG. 5, as an example. Depending on a number of times the rewind signal is asserted, address counter 702 may provide the corresponding read (load) and write (store) addresses to circular buffer 700. Circular buffer 700 may subsequently generate the respective settings (e.g., the respective loop-carried variable) associated with the corresponding read and write addresses. In other words, depending on the number of times the rewind signal is asserted, circular buffer 700 may revert step-wise a same number of times to generate a loop-carried variable consistent with the rewound state.

The generated loop-carried variable may be received by compute block 506 and used in performing compute operations. Additionally, in order to support the circular storage functions of circular buffer 700, compute block 506 may provide previously used loop-carried variable states back to circular buffer 700 via loop path 706. The previously used loop-carried variable states may be used for reversion, as an example. If desired, multiple rewind blocks may be used to keep track of different loop-carried variables.

Figure 8:
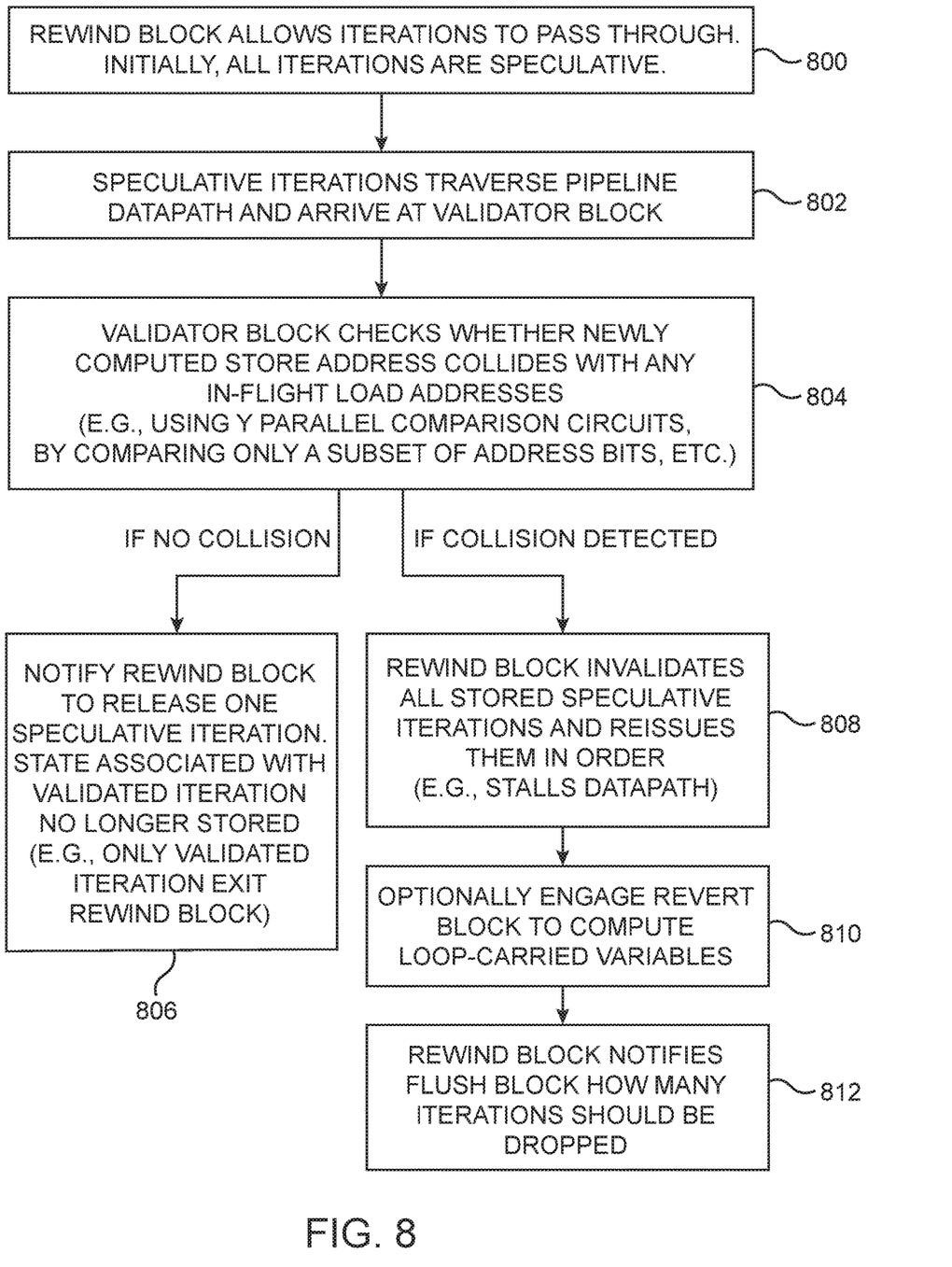
FIG. 8 is a flowchart of illustrative steps for operating throttling circuitry in a datapath by a speculative validation process in accordance with an embodiment.

FIG. 8 shows a flowchart with illustrative steps for operating a throttle block in a datapath using speculative operation, such as the throttle block of datapath 500 in FIG. 5. As previously described the throttle block of a datapath (e.g., datapath 500) may include a rewind block, a revert block, a flush block, and a validator block that includes a dependency detection circuit.

At step 800, the rewind block allows (un-validated) iterations to pass through the rewind block (e.g., rewind block 520 in FIG. 5). In other words, all iterations that pass through the rewind block are speculative or un-validated. While the rewind block allows the speculative iterations to pass through, the rewind block also may keep a copy of the speculative iterations in storage (e.g., using a FIFO circuit) for validation.

At step 802, the speculative iterations may traverse the datapath or pipeline. In particular, a given iteration may pass through a load block (e.g., load block 504 in FIG. 5), which may perform load operations for the given iteration. The given iteration may subsequently also pass a compute block (e.g., compute block 506 in FIG. 5), which may perform compute operations for the given iteration. The compute operations may generate a computed store address as well as other computed data values. The computed store address for the iteration may arrive at the validator block (e.g., validator block 522 in FIG. 5). In other words, the validator block may receive the computed store address associated with the given iteration.

At step 804, the validator block determines whether the newly computed store address (e.g., the computed store address associated with the given iteration) collides with any in-flight load addresses. For example, as previously described in connection FIG. 5, in-flight load addresses may be stored within load-address table 526. Comparison circuitry within dependency detection circuit 524 may compare the computed store address with all of the in-flight load addresses stored in table 526. As an example, Y comparison circuits may be used to compare all Y bits of the in-flight load and computed store addresses. Alternatively, only a subset of the Y bits of the in-flight load and computed store addresses may be compared.

If dependency detection circuit 524 finds no match between any of the in-flight load addresses and the computed store address, no collision has occurred. Once dependency detection circuit 524 ensures that no collision has occurred, processing may proceed to step 806. At step 806, the validator block may notify the rewind block to release the given speculative iteration associated with the computed store address. In other words, the state associated with the validated iteration is no longer stored in the rewind block (e.g., no longer stored in the FIFO circuit in the rewind block). Put another way, only validated iterations may exit the rewind block.

Alternatively, if dependency detection circuit 524 finds a match between at least one of the in-flight load addresses and the computed store address, a collision has occurred. Once dependency detection circuit 524 detects that a collision has occurred, processing may proceed to step 808. At step 808, the validator block may control the rewind block to invalidate all of the store speculative (un-validated) iterations and reissue the invalidated iterations in the same order. Additionally, the validator block may also stall the datapath, or more specifically stall an upstream stage before the rewind block.

At step 810, if a given compute block in the datapath performs compute operations using loop-carried variables, the validator block may also engage (control) the revert block to compute loop-carried variables associated with the previous state of the datapath.

At step 812, the validator block may control the flush block to drop (e.g., delete or remove) the same number of invalidated iterations from the datapath. For example, the rewind block may notify the flush block the number of iterations that the rewind block was previously holding and consequently the number of iterations that should be removed by the flush block from the datapath.

The embodiments thus far have been described with respect to integrated circuits. The methods and apparatuses described herein may be incorporated into any suitable circuit. For example, they may be incorporated into numerous types of devices such as programmable logic devices, application specific standard products (ASSPs), application specific integrated circuits (ASICs), microcontrollers, microprocessors, central processing units, graphics processing units (GPUs), etc. Examples of programmable logic devices include programmable arrays logic (PALs), programmable logic arrays (PLAs), field programmable logic arrays (FPGAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few.

The programmable logic device described in one or more embodiments herein may be part of a data processing system that includes one or more of the following components: a processor; memory; IO circuitry; and peripheral devices. The data processing can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system.

Although the methods of operations were described in a specific order, it should be understood that other operations may be performed in between described operations, described operations may be adjusted so that they occur at slightly different times or described operations may be distributed in a system which allows occurrence of the processing operations at various intervals associated with the processing, as long as the processing of the overlay operations are performed in a desired way.

EXAMPLES

The following examples pertain to further embodiments.

Example 1 is an integrated circuit, comprising: a memory circuit; and a pipelined datapath coupled to the memory circuit, the pipelined datapath comprises: memory access circuitry that reads from the memory circuit using a load address and that writes into the memory circuit using a store address; and throttling circuitry coupled to the memory access circuitry, the throttling circuitry is configured to compare the load address with the store address and to selectively stall a stage in the pipelined datapath based on the comparison.

Example 2 is the integrated circuit of example 1, where the throttling circuitry comprises an address table configured to store a plurality of store addresses and where the plurality of store addresses include the store address.

Example 3 is the integrated circuit of example 1, where the throttling circuitry comprises an address table configured to store a plurality of load addresses and where the plurality of load addresses include the load address.

Example 4 is the integrated circuit of any one of examples 1, 2, or 3, where the memory access circuitry comprises: a memory loading circuit that reads from the memory circuit using the load address; a memory storing circuit that writes into the memory circuit using the store address, where at least a portion of the throttling circuitry is interposed between the memory loading circuit and the stalled stage.

Example 5 is the integrated circuit of example 4, where the pipelined datapath further comprises compute logic interposed between the memory loading circuit and the memory storing circuit.

Example 6 is the integrated circuit of example 5, where the throttling circuitry comprises an address table configured to store a plurality of store addresses, where the plurality of store addresses include the store address, and where the memory storing circuit outputs a clear control signal that removes the store address from the address table.

Example 7 is the integrated circuit of example 5, where the throttling circuitry further comprises a rewind circuit interposed between the memory loading circuit and the stalled stage and where the rewind circuit is configured to store a plurality of iterations and to reissue the plurality of iterations when stalling the stage.

Example 8 is the integrated circuit of example 7, where the throttling circuitry further comprises a validator circuit coupled between the compute logic and the memory storing circuit, the validator circuit is configured to compare the load address with the store address.

Example 9 is the integrated circuit of example 8, where the throttling circuit comprises a flush circuit, the flush circuit is configured to receive the plurality of iterations and to flush the plurality of iterations when stalling the stage.

Example 10 is the integrated circuit of example 8, where the throttling circuit comprises a revert circuit, the revert circuit is configured to compute loop-carried variables for at least some of the plurality of reissued iterations.

Example 11 is an integrated circuit, comprising: memory; compute logic that generates a store address and a load address; a memory loading block that receives the load address from the first compute logic and that reads data from the memory; a memory storing block that receives the store address from the first compute logic and that writes data into the memory; and a throttle block that selectively stalls the compute logic in response to detecting a memory loop dependency collision using the load address.

Example 12 is the integrated circuit of example 11, where the throttle block comprises: an address table for storing a plurality of in-flight store addresses; and a comparison circuit for comparing the load address to the plurality of in-flight store addresses.

Example 13 is the integrated circuit of any one of examples 11 or 12, where the address table is further configured to store the store address generated by the compute logic.

Example 14 is an integrated circuit, comprising: memory; first compute logic that generates a load address; a memory loading block that receives the load address from the first compute logic and that reads from the memory; second compute logic that receives signals from the memory loading block and that computes a store address; and a validator block that selectively stalls the first compute logic in response to detecting a memory loop dependency collision using the computed store address.

Example 15 is the integrated circuit of example 14, where the validator block comprises: an address table for storing a plurality of in-flight load addresses; and a comparison circuit for comparing the computed store address to the plurality of in-flight load addresses to determine whether an iteration associated with the load address and the computed store address has been validated.

Example 16 is the integrated circuit of any one of examples 14 or 15, further comprising: a memory storing block that receives the computed store address and that writes into the memory; and a rewind block coupled between the first compute logic and the memory loading block, the rewind block is configured to ensure that only validated iterations are received at the memory storing block.

Example 17 is the integrated circuit of example 16, where the validator block generates a validate signal in response to detecting that the iteration has been validated and a rewind signal in response to detecting that the iteration has not been validated.

Example 18 is the integrated circuit of example 17, where the rewind block comprises: a first-in first-out (FIFO) circuit configured to store the iteration and additional iterations and to output a speculative count value to the validator block; a first multiplexer coupled at an input of the first-in first-out circuit, the first multiplexer is controlled by the rewind signal; and a second multiplexer coupled at an output of the first-in first-out circuit, the second multiplexer is controlled by the rewind signal.

Example 19 is the integrated circuit of example 17, further comprising: a flush block that receives the iteration from the second compute logic and that flushes the iteration in response to detecting that the iteration has not been validated.

Example 20 is the integrated circuit of example 17, further comprising: a revert block that is coupled to the second compute logic, the revert block is configured to generate loop-carried variables for the second compute logic, the revert block comprises: a circular buffer for storing the loop-carried variables; and an address counter that controls the circular buffer and that receives the rewind signal.

Example 21 is a method of operating an integrated circuit that includes a memory circuit, a pipelined datapath coupled to the memory circuit, the method comprising: with throttling circuitry in the pipelined data path, receiving a store address for accessing the memory circuit during a write operation; with the throttling circuitry, receiving a load address for accessing the memory circuit during a read operation; with the throttling circuitry, comparing the load address with the store address; and with the throttling circuitry, selectively stalling a stage in the pipelined datapath in response to comparing the load address with the store address.

Example 22 is the method of example 21, further comprising: with an address table in the throttling circuitry, storing a plurality of store addresses and where the plurality of store addresses include the store address; and with the throttling circuitry, comparing the load address with the plurality of store addresses.

Example 23 is the method of example 21, further comprising: with an address table in the throttling circuitry, storing a plurality of load addresses, and where the plurality of load addresses include the load address;

and with the throttling circuitry, comparing the store address with the plurality of load addresses.

Example 24 is the method of any one of examples 21, 22, or 23, where the pipelined datapath includes a memory loading circuit and a memory storing circuit and where at least a portion of the throttling circuitry is interposed between the memory loading circuit and the stalled stage, the method further comprising: with the memory storing circuit, writing data into the memory circuit using the store address; and with the method loading circuit, after writing the data into the memory circuit, reading the data from the memory circuit using the load address.

Example 25 is the method of example 24, where the pipelined datapath further includes compute logic interposed between the memory loading circuit and the memory storing circuit.

For instance, all optional features of the apparatus described above may also be implemented with respect to the method or process described herein. The foregoing is merely illustrative of the principles of this invention and various modifications can be made by those skilled in the art. The foregoing embodiments may be implemented individually or in any combination.

What is claimed is:
1. An integrated circuit, comprising:
a memory circuit; and
a pipelined datapath coupled to the memory circuit, wherein the pipelined datapath comprises:
 first compute logic that generates a load address;
 memory access circuitry that reads from the memory circuit using the load address and that writes into the memory circuit using a store address during a store operation; and
 throttling circuitry coupled to the memory access circuitry, wherein the throttling circuitry is configured to compare the load address with the store address to identify the store address as an in-flight store address, and wherein the throttling circuitry is configured to stop new input from entering into the throttling circuitry from the first compute logic and to selectively stall the first compute logic based on the comparison indicating a collision between the load address and the in-flight store address, until the store operation using the store address completes.

2. The integrated circuit defined in claim 1, wherein the throttling circuitry comprises an address table configured to store a plurality of store addresses, and wherein the plurality of store addresses include the store address.

3. The integrated circuit defined in claim 1, wherein the throttling circuitry comprises an address table configured to store a plurality of load addresses, and wherein the plurality of load addresses include the load address.

4. The integrated circuit defined in claim 1, wherein the memory access circuitry comprises:
a memory loading circuit that reads from the memory circuit using the load address;
a memory storing circuit that writes into the memory circuit using the store address, wherein at least a portion of the throttling circuitry is interposed between the memory loading circuit and the first compute logic.

5. The integrated circuit defined in claim 4, wherein the pipelined datapath further comprises second compute logic interposed between the memory loading circuit and the memory storing circuit.

6. The integrated circuit defined in claim 5, wherein the throttling circuitry comprises an address table configured to store a plurality of store addresses, wherein the plurality of store addresses include the store address, and wherein the memory storing circuit outputs a clear control signal that removes the store address from the address table.

7. The integrated circuit defined in claim 5, wherein the throttling circuitry further comprises a rewind circuit interposed between the memory loading circuit and the first compute logic, and wherein the rewind circuit is configured to store a plurality of iterations and to reissue the plurality of iterations when stalling the first compute logic.

8. The integrated circuit defined in claim 7, wherein the throttling circuitry further comprises a validator circuit coupled between the second compute logic and the memory storing circuit, and wherein the validator circuit is configured to compare the load address with the store address.

9. The integrated circuit defined in claim 8, wherein the validator circuit comprises a flush circuit, and wherein the flush circuit is configured to receive the plurality of iterations and to flush the plurality of iterations when stalling the first compute logic.

10. The integrated circuit defined in claim 8, wherein the validator circuit comprises a revert circuit, and wherein the revert circuit is configured to compute loop-carried variables for at least some of the plurality of reissued iterations.

11. An integrated circuit, comprising:
memory;
compute logic configured to generate a store address and a load address;
a memory loading block configured to receive the load address from the compute logic and configured to read data from the memory;
a memory storing block configured to receive the store address from the compute logic and configured to write data into the memory; and
a throttle block configured to identify the store address as an in-flight store address, configured to stall the compute logic, and configured to stop new input from entering into the throttle block from the compute logic in response to detecting a memory dependency collision between the load address and the in-flight store address, until a corresponding store operation associated with the in-flight store address is completed.

12. The integrated circuit of claim 11, wherein the throttle block comprises:
an address table configured to store a plurality of in-flight store addresses; and
a comparison circuit configured to compare the load address to the plurality of in-flight store addresses.

13. The integrated circuit of claim 12, wherein the address table is configured to store the store address generated by the compute logic.

14. An integrated circuit, comprising:
memory;
first compute logic that generates a load address;
a memory loading block that receives the load address from the first compute logic and that reads from the memory;
second compute logic that receives signals from the memory loading block and that computes a store address; and
a throttle block that selectively stalls the first compute logic and stops new input from entering into the throttle block from the first compute logic in response to detecting a memory dependency collision using the computed store address.

15. The integrated circuit of claim 14, wherein the throttle block comprises:
an address table for storing a plurality of in-flight load addresses; and
a comparison circuit for comparing the computed store address to the plurality of in-flight load addresses to determine whether an iteration associated with the load address and the computed store address has been validated.

16. The integrated circuit of claim 15, further comprising:
a memory storing block that receives the computed store address and that writes into the memory, and
wherein the throttle block further comprises a rewind block coupled between the first compute logic and the memory loading block, the rewind block is configured to ensure that only validated iterations are received at the memory storing block.

17. The integrated circuit of claim 16, wherein the throttle block generates a validate signal in response to detecting that the iteration has been validated and a rewind signal in response to detecting that the iteration has not been validated.

18. The integrated circuit of claim 17, wherein the rewind block comprises:
a first-in first-out (FIFO) circuit configured to store the iteration and additional iterations and to output a speculative count value to the throttle block;
a first multiplexer coupled at an input of the first-in first-out circuit, the first multiplexer is controlled by the rewind signal; and
a second multiplexer coupled at an output of the first-in first-out circuit, the second multiplexer is controlled by the rewind signal.

19. The integrated circuit of claim 17, further comprising:
a flush block that receives the iteration from the second compute logic and that flushes the iteration in response to detecting that the iteration has not been validated.

20. The integrated circuit of claim 17, further comprising:
a revert block that is coupled to the second compute logic, the revert block is configured to generate loop-carried variables for the second compute logic, the revert block comprises:
a circular buffer for storing the loop-carried variables; and
an address counter that controls the circular buffer and that receives the rewind signal.

* * * * *